US012639184B2

(12) United States Patent
Nurminen

(10) Patent No.: US 12,639,184 B2
(45) Date of Patent: May 26, 2026

(54) DEVICE TESTING ARRANGEMENT

(71) Applicant: SEGRON Automation, s. r. o., Bratislava (SK)

(72) Inventor: Jari Nurminen, Bratislava (SK)

(73) Assignee: SEGRON AUTOMATION, S. R. O., Bratislava (SK)

( * ) Notice: Subject to any disclaimer, the term of this patent is extended or adjusted under 35 U.S.C. 154(b) by 966 days.

(21) Appl. No.: 17/797,498

(22) PCT Filed: Feb. 2, 2021

(86) PCT No.: PCT/EP2021/052417
§ 371 (c)(1),
(2) Date: Aug. 4, 2022

(87) PCT Pub. No.: WO2021/156243
PCT Pub. Date: Aug. 12, 2021

(65) Prior Publication Data
US 2023/0050723 A1 Feb. 16, 2023

(30) Foreign Application Priority Data
Feb. 5, 2020 (EP) .................................... 20155600

(51) Int. Cl.
*G06F 11/263* (2006.01)
*G06F 11/22* (2006.01)
*G06F 11/273* (2006.01)
(52) U.S. Cl.
CPC ........ *G06F 11/263* (2013.01); *G06F 11/2268* (2013.01); *G06F 11/2733* (2013.01)

(58) Field of Classification Search
None
See application file for complete search history.

(56) References Cited

U.S. PATENT DOCUMENTS

| | | | |
|---|---|---|---|
| 8,924,938 B2 | 12/2014 | Chang et al. | |
| 10,664,388 B2 * | 5/2020 | Mitchell | G06F 11/3698 |
| 10,776,252 B1 * | 9/2020 | Weiss | G06F 11/3698 |
| 2012/0198279 A1 | 8/2012 | Schroeder | |
| 2014/0059386 A1 * | 2/2014 | Atkinson | G01R 31/31905 |
| | | | 714/33 |

(Continued)

OTHER PUBLICATIONS

Calpur, Mehmet Cagri et al., "Towards having a cloud of mobile devices specialized for software testing," Mobile Software Engineering and Systems, ACM, pp. 9-10, (May 14, 2016).

(Continued)

*Primary Examiner* — Ryan D. Coyer
(74) *Attorney, Agent, or Firm* — ALSTON & BIRD LLP

(57) ABSTRACT

An arrangement for automated testing of mobile devices comprising a learning arrangement for learning how to use test devices that do not match with an earlier already defined test case pattern. In the arrangement the learning arrangement generates instructions for performing a set of tasks. The tasks are then executed in the mobile device being tested. The mobile device provides feedback in form of error/success messages, screenshots, source code, return values and similar. Based on the feedback and earlier accumulated information the learning entity can generate a new set of instructions in order to execute the set of tasks successfully.

16 Claims, 7 Drawing Sheets

(56)                    References Cited

U.S. PATENT DOCUMENTS

2015/0161386 A1 *  6/2015  Gupta ...................... G06N 5/04
                                                726/22
2016/0062879 A1 *  3/2016  Tan ..................... G06F 11/3698
                                                714/38.1
2019/0227917 A1 *  7/2019  Henry ................. G06F 11/3684
2019/0384699 A1 * 12/2019  Arbon ................. G06F 11/3698
2020/0167270 A1 *  5/2020  Yang ................... G06F 11/3684

OTHER PUBLICATIONS

Villanes Rojas, Isabel et al., "Cloud-Based Mobile App Testing
Framework: Architecture, Implementation and Execution," System-
atic and Automated Software Testing, ACM, pp. 1-10, (Sep. 19,
2016).
Vuong, Thi Anh Tuyet et al., "A reinforcement learning based
approach to automated testing of android applications," Proceedings
of the $9^{th}$ ACM Sigsoft International Workshop of Automating Test
Case Design, Selection, and Evaluation, A—Test,2018, pp. 31-37,
(Nov. 1, 2018).
Extended EP Search Report for application EP Application No.
20155600.8 mailed May 6, 2020.
International Search Report and Written Opinion for PCT Applica-
tion PCT/EP2021/052417 mailed Apr. 29, 2021.

* cited by examiner

Receiving a request to generate new device test automation configuration — 200

Receiving at least one use case comprising a set of tasks — 201

Generating instructions for performing the tasks — 202

Adapting instructions — 203

Instructing the mobile device to perform the tasks — 204

Receiving feedback from the mobile device — 205

Storing the device test automation configuration — 206

DEVICE TESTING ARRANGEMENT

CROSS-REFERENCE TO RELATED APPLICATIONS

The present application is a national phase entry of International Application No. PCT/EP2021/052417, filed Feb. 2, 2021, which claims priority to European Application No. 20155600.8, filed Feb. 5, 2020, which are each incorporated herein by reference in their entirety.

This disclosure relates to device testing and particularly testing network functionality of various types of devices using automatic testing approach.

Devices sold to end users and other business clients are commonly tested. Depending on the device category the testing may be performed for all produced devices or using a random pick for testing. When testing is performed for a high number of devices automatic testing approaches are typically used.

When testing a mobile device, such as a mobile phone or similar mobile communications network connected device, the testing arrangement is typically configured to perform a test sequence comprising a plurality of desired functions. These may involve functionality that is completely executed in the device or functionality that is interacting with the network or other devices. An example of the first is changing settings of the mobile device and an example of the second is making a call to another mobile device. As mobile devices are complicated they have a high number of different use cases that need to be tested. For example, when testing network connectivity it may be necessary to test calling, sending messages and connecting to the Internet using several different network technologies (e.g. 4G, 5G, WiFi). As a consequence the number of cases to be tested increases.

Verifying network connectivity increases the complexity of the testing arrangement, because the modern communication networks are highly complex and can be set up in many different ways. This increases the number of cases to be tested even more, because the testing scope needs to consider the subscribed services (e.g. pre-paid and post-paid users), network technologies and network configuration (e.g. is the user having a fast-speed data service active). This also adds complexity to the testing arrangement architecture. For example: the devices need to be registered in the target network (i.e. network under testing), e.g. SIM-card from the network operator is needed and the device resides in a location with target network coverage. To verify different aspects of the network connectivity, multiple locations might be required.

Modern mobile devices range from embedded (e.g. IoT chips) to small computers that have an operating system and often a graphical user interface to it. Using the operating system interfaces and the graphical user interface the user may control the device in various ways. This increases the number of possible use cases even further. When these modern mobile devices are tested in a high-volume testing environment it is crucial that the automated test environment is able to perform all the tests. However, this might not be always the case. For example, updating the operating system may have desired and undesired changes to the behavior of the device. If the user interface has been changed the functionality cannot be found from the same location and in such case automated test environment cannot perform the test. In some cases the testing can be performed by a test technician or engineer, however, if the tested objects come in high volumes it may be necessary to change the testing environment.

SUMMARY

An arrangement for automated testing of mobile devices is disclosed. The arrangement comprises an arrangement for learning how to use test devices that do not match with an earlier already performed tests. In the arrangement the learning algorithm generates tasks for performing steps that are needed to automate a device feature. The tasks are then executed in the device under learning (DUL), i.e. the mobile device being learned. The mobile device provides feedback in form of error/success messages, screenshots, source code, return values and similar. Based on the feedback and earlier accumulated information the learning entity can generate a new set of tasks in order to successfully complete the learning of device feature automation. The outcome of the learning is made available as device test automation configuration for further use, for example in device testing host.

In an aspect a method for generating a device test automation configuration for testing network features of a mobile device is disclosed. The method comprises receiving a request to generate new device test automation configuration for a mobile device from a client host to which the mobile device is connected; receiving at least one use case comprising a set of steps to be performed in a functionality test of the mobile device, wherein each of the steps comprises a set of tasks for performing the respective step; generating instructions for performing the steps of received at least one use case. Said generating further comprises performing the following steps at least once: generating an initial set of instructions for a use case; adapting the set of instructions based on the information generated earlier for similar mobile devices; instructing the mobile device to perform the steps according to received use cases; and receiving feedback from the mobile device, wherein the feedback is used in adapting the instructions. Finally, the method further comprises storing the device test automation configuration comprising the use cases based on the generated instructions for the mobile device to a database for further use.

It is beneficial to use learning arrangement for generating the device test automation configuration so that experience from earlier tested devices can be taken into account when generating device test automation configuration. The learning entity is capable of learning a solution when the earlier generated instructions are not successful. Furthermore, it is capable of performing retries for a functionality with an improved probability of trying correct action so that all possible actions need not to be tried. The learning may be iterative or any other traditional learning by trying and in more advanced implementations learning may be at least partially machine learning based.

In an implementation the method further comprises transmitting the generated device test automation configuration to a device testing host for testing a plurality of mobile devices in accordance with the generated device test automation configuration. The transferrable device test automation configuration is beneficial because it needs not to be generated at the testing entity.

In an implementation the method further comprises using the received feedback and the information generated earlier as an input in a machine learning algorithm for generating instructions for the mobile device. It is beneficial to use the received feedback to improve the probability to choose the correct functionality. The feedback easily reveals, for example, that a different type control is involved and it must be used in a different manner.

In an implementation a plurality of instructions are provided in one instruction set. It is beneficial to have a possibility to provide tasks in one set so that a plurality of tasks can be executed if feedback is not needed immediately. This reduces messaging and the time to get the feedback when it is required.

In an implementation feedback is received as a response to one or more instruction set. It is beneficial to be able to receive feedback to an instruction set as whole. This reduces messaging as sometimes the feedback is required only for the last step.

In an implementation the method further comprises analyzing feedback. It is beneficial that the feedback is analyzed so that the next instructions can be generated with the help of latest feedback.

In an implementation the feedback comprises a screenshot of the tested device. It is beneficial to have screenshots as the show how the device user interface looks like. Furthermore, some of the tasks are not successful even if no error message has been generated. From the screenshot it is possible to determine the condition even if no other feedback has been received.

In an implementation the feedback comprises a source code of a screen of the tested device. The source code of the screen provides exact information of the screen and what is on the screen.

In an implementation the feedback comprises outputs of the commands executed. The outputs of the commands comprise information whether the task was successful or not. The error messages sometimes comprise an explicit reason why the task was unsuccessful.

In an implementation the feedback comprises a device log. The logging information provides a possibility to analyze what has happened in the device before the current task. It may be necessary to reconsider also earlier steps because they may be causing the problem.

In an aspect a computer program is disclosed. The computer program comprises computer program code, which is configured to cause performing a method as disclosed above, when the computer program is executed in a computing device.

In an aspect an apparatus for generating a device test automation configuration for a mobile device is disclosed. The apparatus comprises at least one processor configured to execute computer programs; at least one memory configured to store computer programs and related data; at least one network connection for receiving and transmitting instructions to external devices; wherein the apparatus is configured to perform a method as disclosed above.

BRIEF DESCRIPTION OF THE DRAWINGS

The accompanying drawings, which are included to provide a further understanding of the device testing arrangement and constitute a part of this specification, illustrate embodiments and together with the description help to explain the principles of the device testing arrangement. In the drawings.

DETAILED DESCRIPTION

Reference will now be made in detail to the embodiments, examples of which are illustrated in the accompanying drawings.

In the following disclosure the device testing host is a test execution entity that is connected to one or more devices and that is executing one or more Test Suites. There can be one or more test execution entities. The connection is such that it is able to execute the test commands in the tested device. This may be a wireless connection, wired connection, docking device or similar.

The test suite is a collection of test cases that aim to verify one functional area. For example, "Mobile Voice Calls" test suite comprises test cases for testing voice call functionality.

A test case is a collection use cases that aim to verify a functional scenario. For example, "Mobile To Mobile Voice Call in 3G Network" test case. A use case is a sequence of steps that is needed to accomplish the goal of the use case. For example, "Activate 3G Network" use case, could consist of "Open Settings App", "Open Network Mode Menu", "Set Preferred Network to 3G-Only" steps. Use cases are the building blocks that the test engineers combine to create test cases for various functional scenarios ("3G Call", "4G Call", "A calls B", "B calls A" etc.).

A device test automation configuration binds the abstract use case steps to device specific tasks that accomplish the use case goal. For example, on a device the "Open Network Mode Menu" step could consist of navigating though submenus, e.g. "Connectivity", "Mobile Networks", "Network Mode", and on another device the "Network Mode" could be on the first screen.

When generating device test automation configuration, the device learning arrangement sends instructions to the device. Instruction is a set of tasks that are executed on the device. feedback contain the results of the instructions which is used to generate the device test automation configuration for a given device.

Tasks comprise commands, computing instructions, instructions or similar that are executed by a processor or similar processing device and when performed together cause the tested device to perform a requested action.

Figure 1:
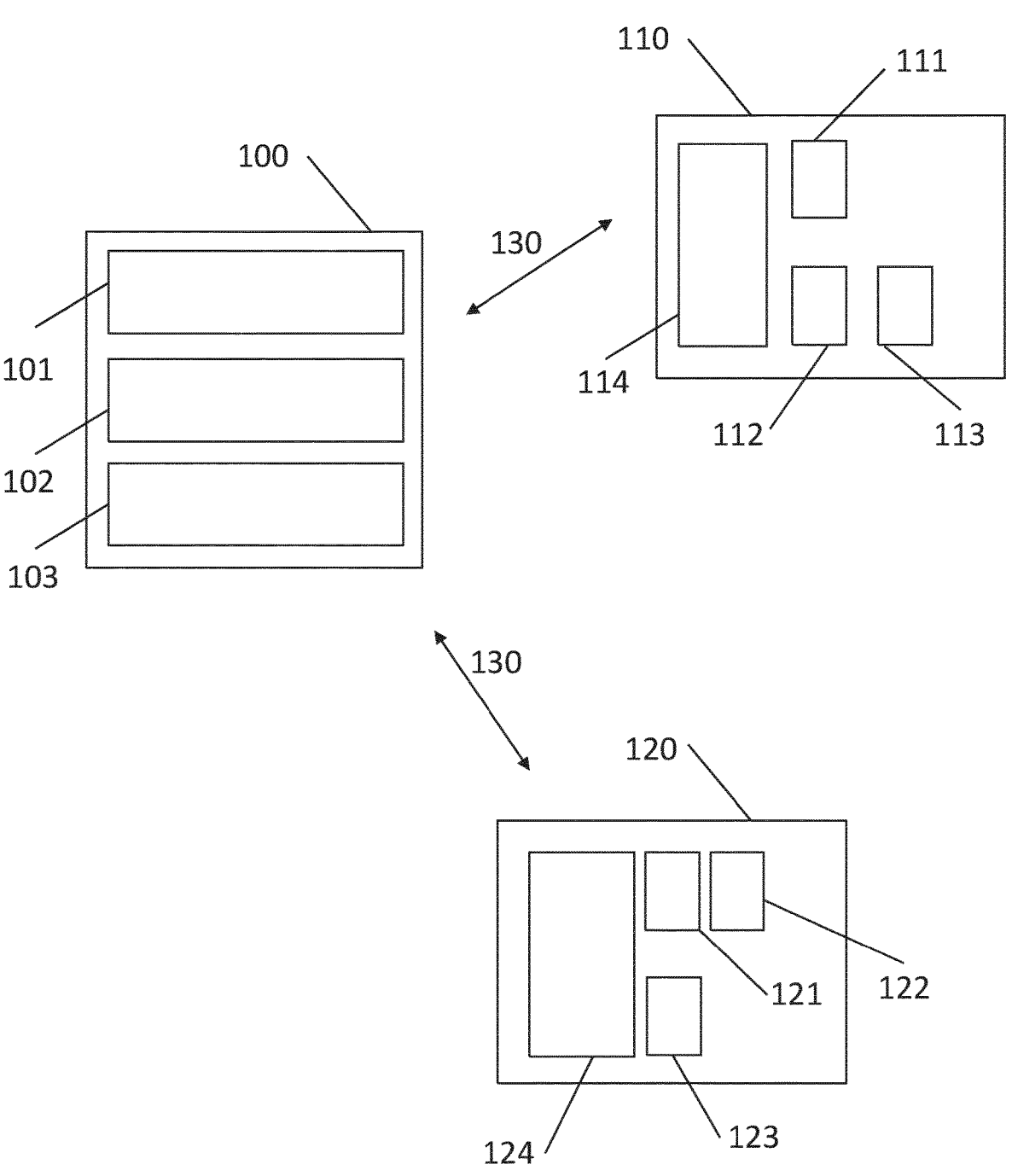
FIG. 1 is a block diagram of an example of a device testing arrangement.

In FIG. 1 a block diagram of an example of a device testing arrangement is shown. In FIG. 1 a device learning service 100 is shown together with a device learning host 110 and a device testing host 120. The device learning host 110 and the device testing host 120 are connected to the device learning service 100 using The Internet 130 or a local area network connection. The connection may be at least partially wireless and implemented using mobile communication networks. In another example all of these entities are implemented within one particular computing device, however, the example of FIG. 1 provides more flexibility and a possibility to provide more learning material for the learning service 100.

The device learning service 100 comprises at least one processing unit 101, at least one memory 102 and at least one network connection 103. The at least one processing unit 101 may be a general purpose processor or a processing unit comprising special purpose processing units. The at least one processing unit 101 is configured to execute computer programs and perform computing tasks according to executed computer programs. The at least one memory

102 may comprise volatile and non-volatile memories that are configured to store computer programs and related data during the processing. The at least one network connection 103 may comprise one or more network adapters including wired and wireless connections. Example implementations of the device learning service 100 include a cloud computing entity, a server computer or similar computing entity that is configured to perform the requested actions in accordance with the following description. The expression cloud computing should be interpreted here to have equivalent functionality with a server. Thus, the cloud computing entity providing the requested service is able to provide functionality similar to a server by providing processing capacity and memory for storage needs.

The device learning host 110 comprises at least one processing unit 111, at least one memory 112 and at least one network connection 113. Which may be similar to the corresponding components of the device learning service. However, typically the processing power and memory capacity are lower compared to the service as the purpose of the device learning host 110 is to connect a new device 114 to be learned to the device learning service 100. The device learning host 110 performs the instructions, that it receives from the device learning service 100, on the tested device 114 and transmits the results as feedback to the device learning service 100. For example, the device learning host 110 may receive from the device learning service 100 instructions to call a number or to send an SMS-message to a particular number. The device learning host 110 performs these instructions by using appropriate interfaces and acquires feedback, for example in a form of error and success messages received from an API and/or by taking a screenshot showing the error or success message. The device 114 is coupled to the device learning host 110 using available means, such as a cable connection or wireless network connection. The appropriate interfaces may include, for example, acquiring information on buttons or menu items located on the screen and choosing the button or menu item with right content, such as a title or caption. Another example involves analyzing the screen and producing a simulated touch on the touch screen at a desired location. The simulated touch may include also a gesture. Thus, a plurality of coordinates may need to be transmitted to the API or entity that receives the input from the touch screen and translates that into a set of coordinates or other means of input. The device learning host 110 can exist multiple times in the testing arrangement.

The device testing host 120 is the entity that is performing the actual testing. The mobile device 124 is attached or connected to the device testing host 120. The device testing host receives device test automation configuration from the device learning service 100. The test cases, utilizing the device test automation configuration, comprise test sequences that are executed by at least one processor 121 and the results are collected to at least one memory 122. The instructions are received by using at least one network connection 123. The device 124 is coupled to the device testing host 120 using available means, such as a cable connection or wireless network connection. The device test automation configuration received from the device learning service 100 may be stored to the at least one memory 122 for later use. Thus, they need to be received only once from the device learning service 100 or they can be received multiple times upon a request. The device test automation configuration includes information on how to perform needed actions with the tested device 124. For example, a sub-set of device test automation configuration may be a sequence of commands required for turning wireless network adapter off or activating silent mode. In such case the sequence comprises opening correct menu and activating a correct menu item from there. The device learning host 120 can exist multiple times in the testing arrangement.

The sequences of tasks are arranged in a manner so that each task is a part of a program code needed to complete a use case step. A use case comprises a plurality of steps. Thus, the tasks required for performing a use case include typically tasks required for performing a plurality of steps. In addition to actual commands the tasks may comprise additional information, such as a location of a button. For example, when the purpose of a task is to cause pressing of a button, it is necessary to know where the button is. If the location is not known, it may be necessary to find out the location of the button so that the information can be adapted for that particular device.

The above disclosed memory arrangement may be used in several different ways. For example, the arrangement may be instructed manually to download the device test automation configuration to the at least one memory 122 for later used. On the other hand it is possible to use the at least one memory 122 as a cache or a temporary storage for device test automation configuration retrieved on demand. In a more advanced implementation the at least one memory 122 stores the device test automation configuration for a later use, however, the device learning host may be configured to automatically check for an updated set of device test automation configuration. More advanced implementations may comprise functionality, wherein the device test configuration is stored into the memory and when a testing event begins device testing host checks if it has the latest version of the device test automation configuration. If there is a more recent version available, then the device test automation configuration may be retrieved completely or partially so that the changed portion is retrieved. In another option the device test automation configuration is retrieved in portions. In such implementation it is determined which portion of the device test automation configuration needs to be retrieved. This is particularly beneficial when there is very high number of device test automation configuration and testing does not involve always using them all. In such cases memory can be saved by retrieving only those parts of a device test automation configuration that are actually needed.

When the device testing host 120 performs a test, all functions should be successful. If the device 124 fails to perform the requested action it may be indication of a defect or malfunctioning device. However, in some cases this may also be a small change in the device so that the old command sequences do not work anymore even if the device is working correctly. The small change may be intentional or unintentional, such as a bug. In this case the device may be reintroduced to the device learning host 110 with a request to perform and re-learn the failed test.

During the learning process the device 114 that is attached or connected to the device learning host 110 receives instructions that have been determined by the device learning service 100. Thus, the device learning service 100 is sending instructions and expects receiving feedback. Based on the received feedback and already accumulated data from earlier learned devices the at least one processing unit 101 uses a machine learning based algorithm, or similar algorithm capable of adjusting instructions as a response to the feedback, to determine how it should instruct the device to perform the tasks associated with a use case, for example, how to turn the device into a silent mode. The instructions are adapted as long as required to get the operation successfully executed.

Figure 2:
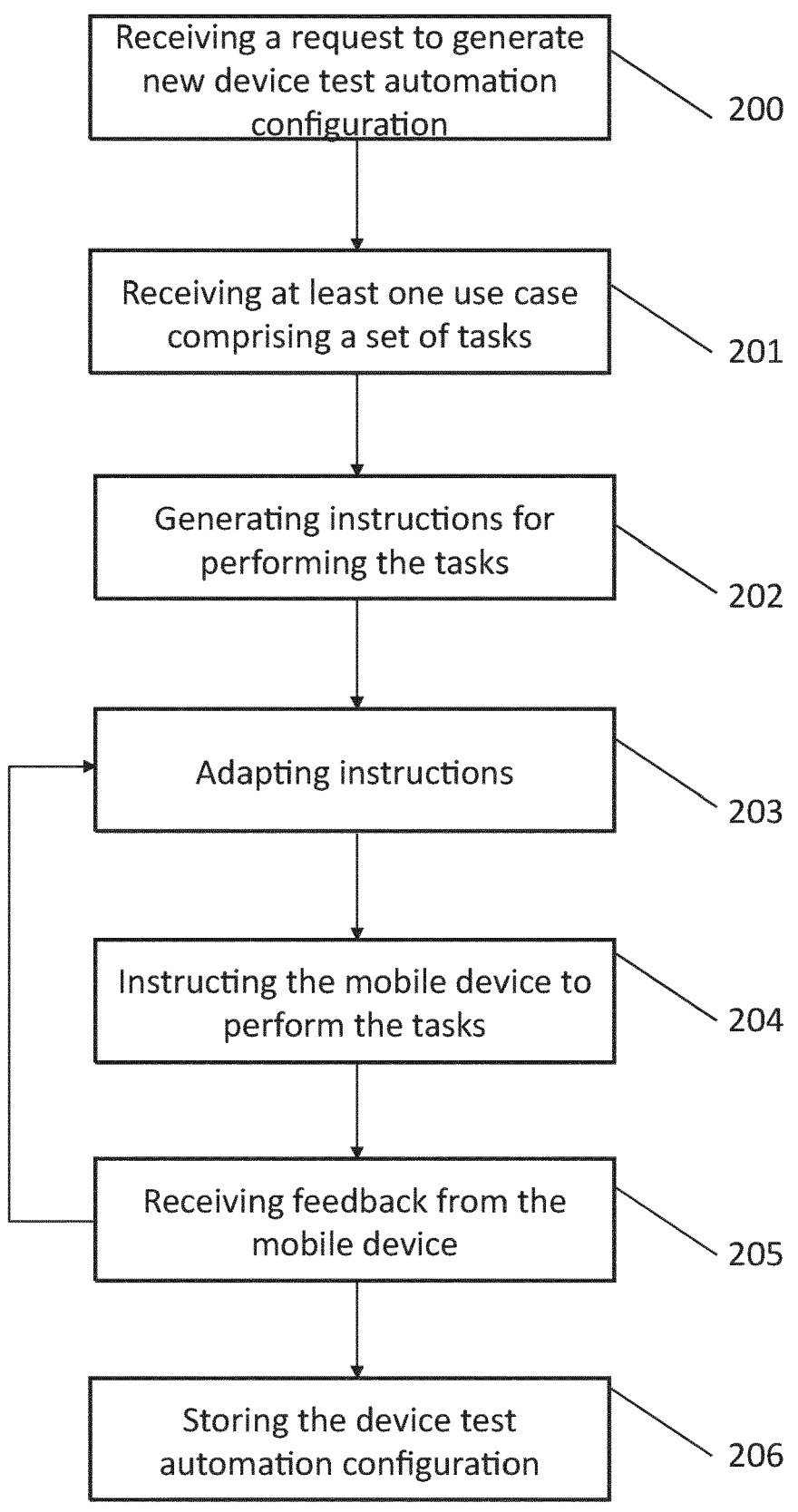
FIG. 2 is a flowchart of a method according to an example of a device testing arrangement.

FIG. 2 shows an example of a method for a device testing arrangement. The method can be performed, for example in a device learning service 100, wherein the communication is performed with a device learning host 110. The example of FIG. 1 is referred here only as an option and other similar arrangements may be used for performing the method.

The method is initiated by receiving a request to generate new device test automation configuration, step 200. The device test automation configuration means here a configuration that is necessary for performing tests according to one or more use cases that are also received, step 201. The device test automation configuration includes information on the configuration of the device including, for example, the information of location of buttons or other commands how the use cases can be executed. It is possible that performing one feature several different ways can be used. In the context of this application a use case refers to one particular way of performing a feature or action. For example, switching mobile data off may require activating the settings menu, choosing a network from a first menu, choosing manage sim cards from a second menu that has been opened as a result from choosing the network from the first menu and then finally switching mobile data off from the second menu. As mobile devices are complicated there are hundreds or even thousands different use cases that need to be tested.

For performing a test of a desired feature or action a set of tasks for performing the action need to be generated. The tasks cannot be retrieved directly from a data base as the device test automation configuration relates to a new case involving completely new device or an old device with modifications. The first generation step 202 can involve a generation of initial set of tasks for a use case. The initial set is then adapted based on the similar devices and later also based on the feedback received from the device, step 203. The set of tasks is then provided to the mobile device for execution, step 204. The mobile device tries to execute the tasks. When executing it is possible that comes a positive result, negative result or nothing. The positive result may be, for example a success message or launching an action from which the success can be determined. The negative result may be an error message or launching an action that was not desired and from which a negative result may be determined. It is also possible that nothing happened because the generated tasks caused a simulated touch on a location which is not associated with any functionality or the functionality was disabled without response. This is commonly interpreted to be a negative result as the tasks failed to cause a simulated touch on a correct location.

The executed tasks and the received feedback, step 205, are provided to a learning algorithm that tries to correct the tasks based on the knowledge gained from the received feedback and the earlier feedback relating to earlier devices. This may be performed by adapting the tasks as long as a positive results is achieved. Thus, if the feedback is not positive then the method returns to the step 203 and adapts the information. The learning process needs not to learn always everything from the scratch. For example, if a second use case involves activating same menu items, touching same buttons or similar, the correct tasks are easier to generate as the location and activation of the requested feature or action has already been learned. Thus, it is possible to combine subsequences learned during earlier use cases. Finally, the device test automation configuration is stored for later use, step 206. The stored device test automation configurations can be retrieved when the actual devices are tested in volume.

Figure 3:
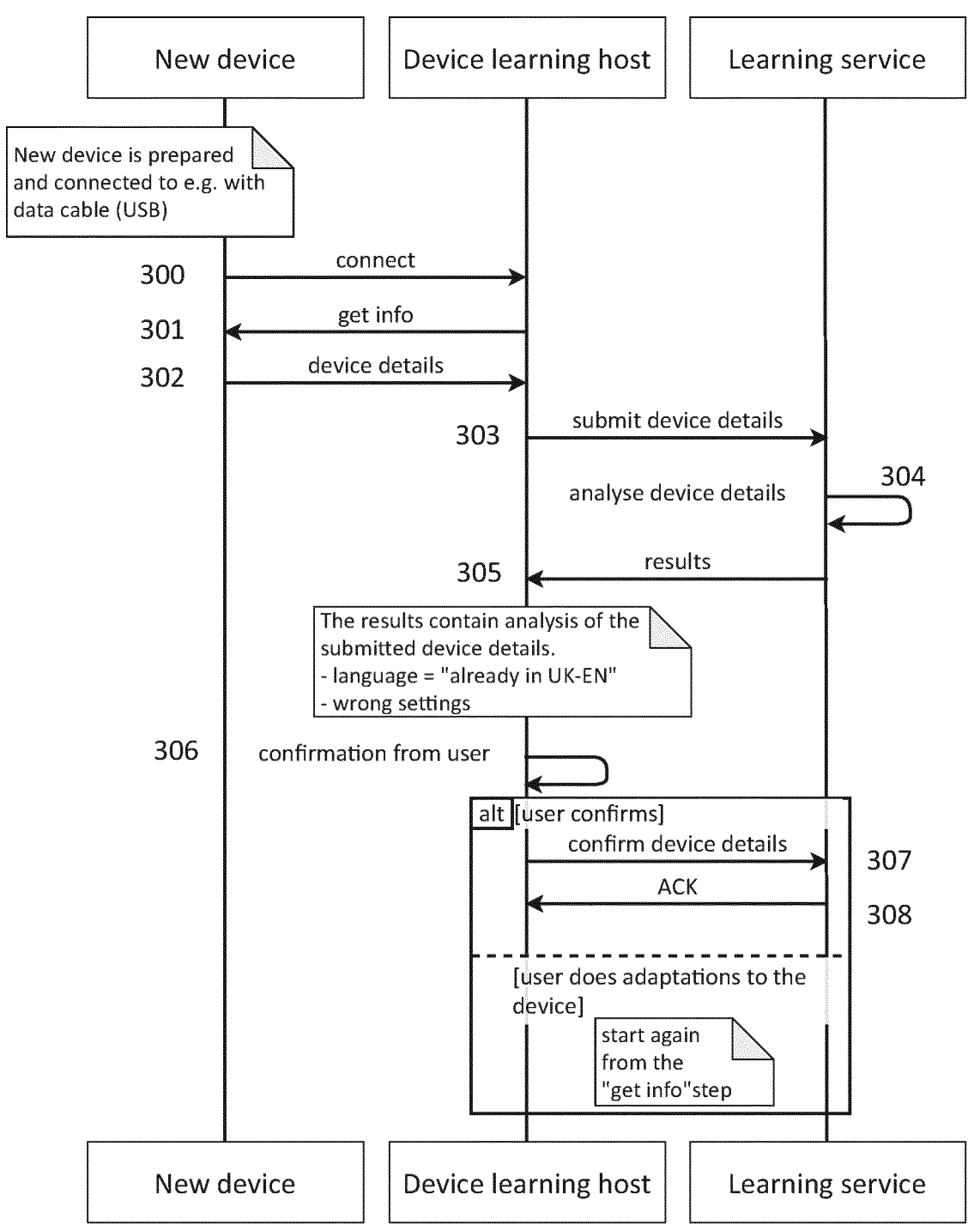
FIG. 3 is a signaling chart illustrating example of signaling in a device testing arrangement.

In FIG. 3 an example signaling sequence of device identification is shown. A new device is attached or connected to the learning host, which is further connected to the device learning service. The learning host uses device platform's, such as Android, iOS or Windows, available interfaces to retrieve device details. These details may include manufacturer, model, hardware, screen resolution, firmware and OS version, installed applications and their versions. The SIM (Subscriber Identity Module) may also be relevant for the device details, because it has an impact on the screens. For example, some menus may have different labels. The device details are unique for each device type.

In the figure a connect request is first sent, step 300. As a response to a successful connect request the learning host requests device information, step 301. The device responds to the request by transmitting the device details to the learning host, step 302. The learning host forwards this information to the device learning service, step 303. The device learning service is configured to analyze device information, step 304.

The analysis step comprises analyzing errors in the device settings, for example, missing SIM card would prevent testing of many network features. The analysis further comprises analyzing recommendations, for example, the device already exists with another language setting—propose to use the existing language instead of learning to use the device with the requested language. The analysis may also comprise analyzing optional features that might be enabled on the device firmware, for example, VoLTE, VoWiFi or 5G. The analysis also may include analysis of known issues with similar devices, for example, device is unavailable after reboot. In such case it is proposed to try reboots first or skip reboots completely. Analysis steps may include requesting a confirmation from the user.

The analysis results are returned to the learning host, step 305, that prompts the user to confirm them, step 306. If the user decides to update the device settings, then the flow starts from the beginning and a new set of device details are submitted to the device learning service. If the user accepts the results the settings are confirmed and submitted to the device learning service, step 307. This message is then acknowledged, step 308.

Figure 4:
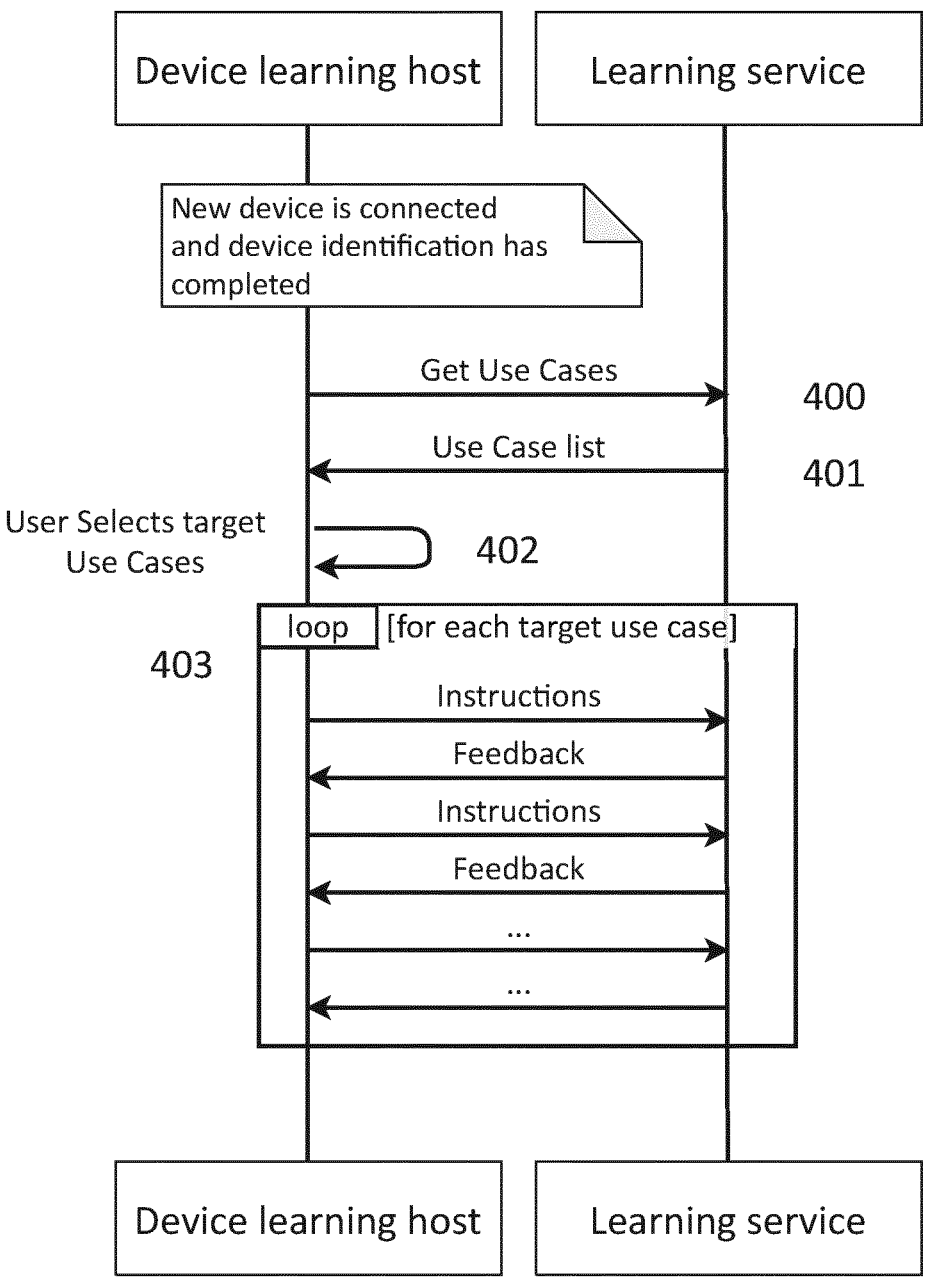
FIG. 4 is an example of a device learning process.

In FIG. 4 an example of a device learning process is shown. In the process the device learning host requests a use case list, step 400, from the device learning service after the device identification has been completed. The device learning service responds, step 401, with a list of applicable use cases for the requested device. These are depending on, for example, the use cases that are currently known to the device learning service and the connected device details, for example, some use cases are available only on certain device platforms.

The applicable use cases are presented to the engineer operating the device learning client who has the possibility to add or remove use cases before starting the automated device learning process, step 402. After the target use cases are selected the device learning client triggers the device learning that will automate all selected use cases on the new target device. Maintaining the use cases in the device learning service means also that the supported use cases can be extended without changing/upgrading the device learning host.

When the use cases are selected then the learning through a looping learning method can be started. As shown in FIG.

4, the loop 403 can be executed several times so that the learning host receives instructions from the device learning service, applies them to the tested device and then provides feedback to the device learning service. The looping can be performed as long as needed for successful completion of the use case that is being tested or another termination condition, such as a number of iterated loops, has been reached.

Figure 5:
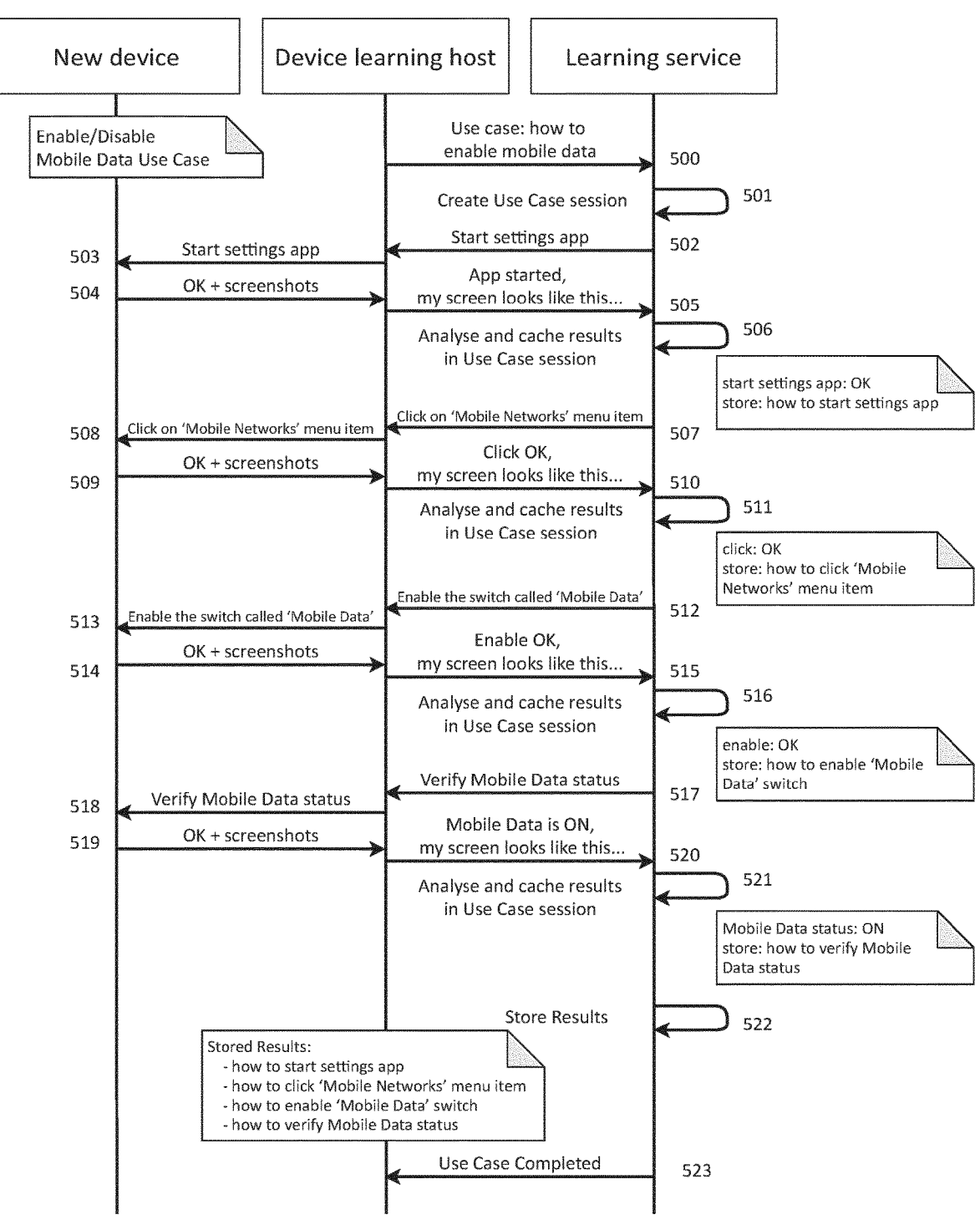
FIG. 5 is an example of a use case relating to enabling or disabling mobile data use in a mobile device.

FIG. 5 is an example of a use case relating to enabling or disabling mobile data use in a mobile device. The method is initiated by the device learning host sending a signal to the device learning service, step 500. The device learning service creates a use case session, step 501, wherein it is determined that the first task is to enable the settings menu or app in the mobile device. As a consequence a signal for starting the settings app is sent to the device learning host, step 502, which sends it further to the new device being learned, step 503. The device tries to execute the command. As a result a success message and screenshots about the current screen are sent as a feedback to the device learning host, step 504. The device learning host sends a signal to the device learning service, step 505. The signal provides the information that the app has been started and also provides the screenshot for further analysis. The analysis is performed by the device learning service, step 506.

As a result the device learning service determines that the settings app was launched successfully. The information how to start settings is cached. The next step is to find the menu item controlling mobile networks. The device learning service sends a signal with an instruction to perform a simulated touch on mobile networks menu item, step 507. The instructions are provided further to the tested device, step 508. Again, a success message is sent together with screenshots, step 509. The device learning host forwards this message to the device learning service, step 510, which uses this as a feedback. The feedback is analyzed, step 511 and then instructions how to click mobile networks menu item are stored. The next instruction is to enable mobile data switch, which either enables or disables mobile data connection. The instructions to enable are sent to the device learning host, step 512, which forwards the signal on the device, step 513. As a response a success message with screenshots is received, step 514. The device learning host forwards these to the device learning service, step 515. The received messages and screenshots are again used as a feedback and analyzed, step 516. In the example of FIG. 5 the enablement was successful and instructions to enable mobile data switch are stored into the cache. Then, the status of the mobile data is verified. A request to verify is sent to the device learning host, step 517. The device learning host forwards the message further to tested device, step 518. The verification result and screenshots are received as a feedback, step 519. The device learning host sends results to the device learning service, step 520. The device learning service now knows that the mobile data is on and how does the screen look like after the activation. The results, including the screenshot, are again analyzed, step 521. As the activation was successful the use case is at the end. All relevant data relating to the use case and instructions needed to perform the use case are stored, directly or using a cache, to knowledgebase or database, step 522. This relevant data, a configuration consisting information how to perform a use case, is stored so that it can be later retrieved so that devices can be tested without a need to learn the use case again. A signal to the device learning host for completing the use case is sent, step 523.

Figure 6:
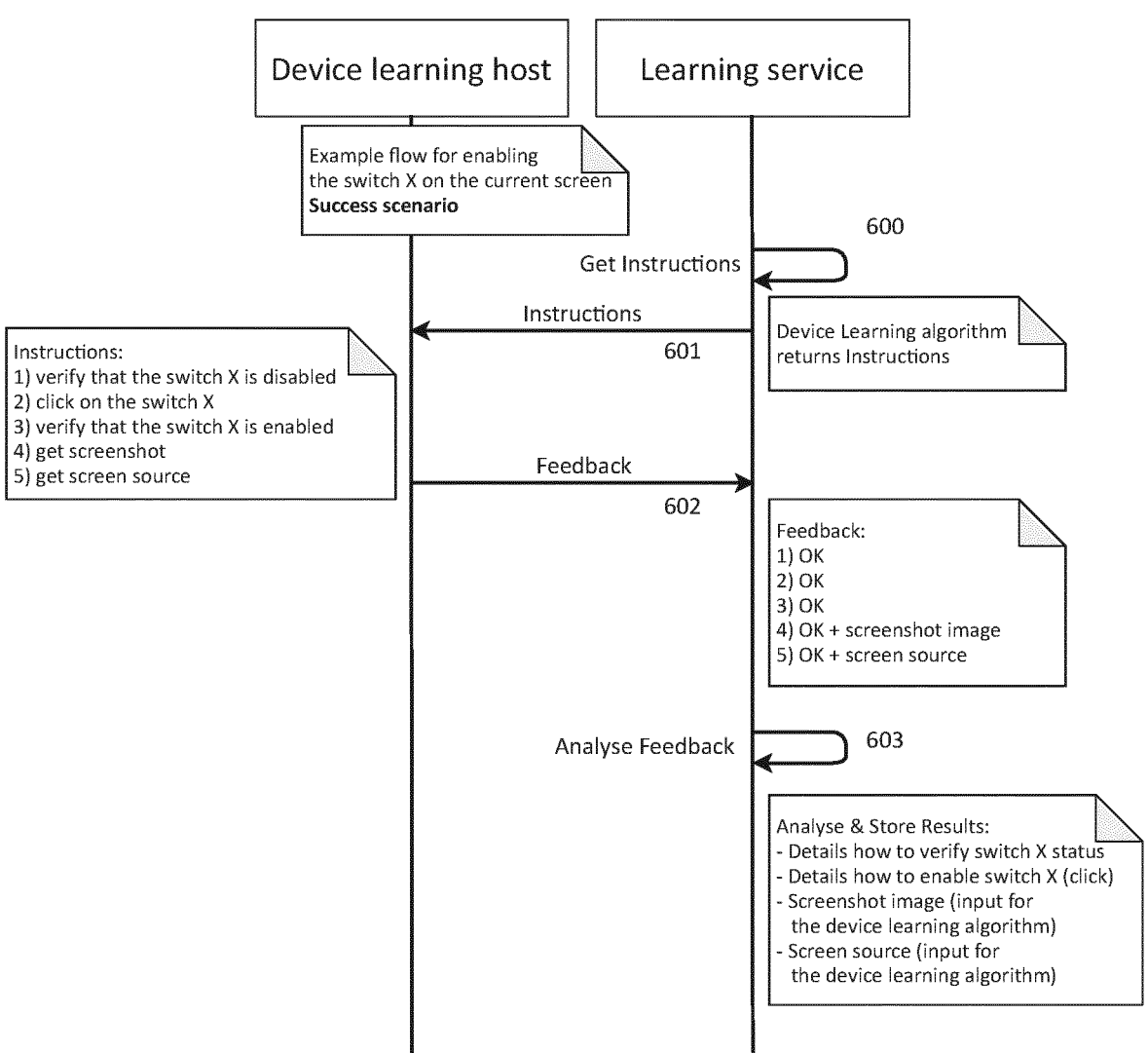
FIG. 6 is an example of a signaling chart that discloses the procedure for enabling a switch in more detail.

FIG. 6 is an example of a signaling chart that discloses the procedure for enabling a switch in more detail. The switch may be the enable mobile data switch of the previous example. The method is initiated by getting instructions, step 600. The device learning algorithm at the device learning service generates a set of instructions that are passed to the device learning host for execution, step 601. The device learning instructions may comprise following tasks. First, it is verified that the switch is unchecked. Then, after successful verification a simulated touch, or any other means for performing a click on the switch, is generated. After the click the status of the switch is verified. As a verification result the checked switch is received. Then, a screen shot is acquired for further analysis. In the example of FIG. 6 in addition to the screen shot the screen source code is acquired. This information is then transmitted to the device learning service, which determines that all the tasks were performed successfully, step 602. In the example of FIG. 6 it is only the device learning service that makes any determinations based on the received results. This is because in case of unsuccessful execution of instructions it is the device learning service that determines how to react. Then, the received feedback is analyzed, step 603. Finally the information is stored. It should be noted that the information may be stored in relation with the instructions, or the task set, and also used as an input of the learning arrangement, such as a neural network or other machine learning algorithm as training material.

Figure 7:
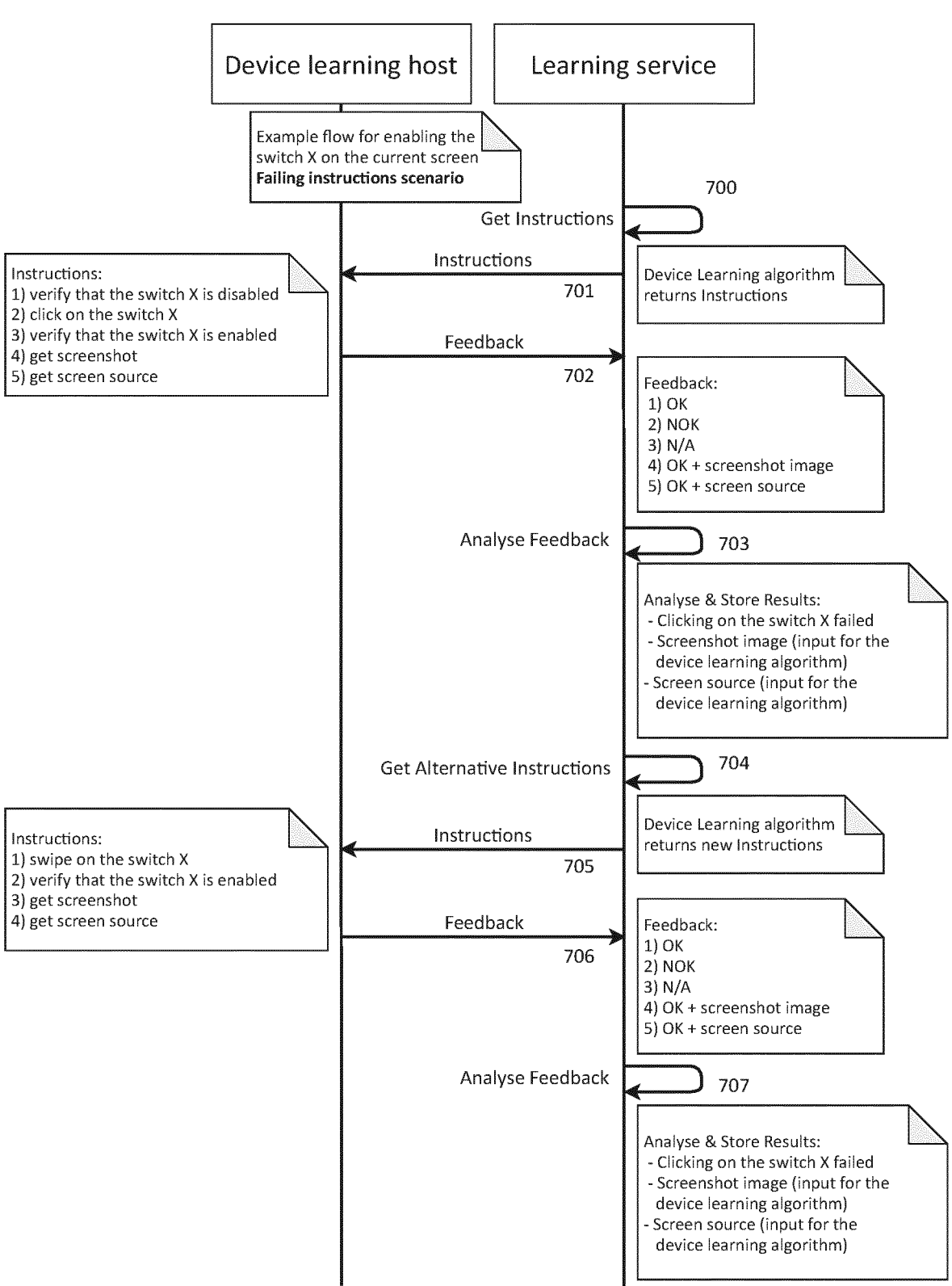
FIG. 7 is another example of signaling.

In FIG. 7 another example of signaling is shown. The example of FIG. 7 involves performing the same procedure with FIG. 6, however, the FIG. 7 illustrates the scenario wherein the procedure at least partially fails. Even if a switch is used as an example in FIGS. 6 and 7, the same principles can be applied to different procedures and controls.

The example of FIG. 7 initiates accordingly, step 700, after which the generated instructions are sent to the device learning host, step 701. Then the instructions are executed in a tested device, step 702. These steps are assumed to be identical with the example of FIG. 6. However, the received feedback now indicates that the click on the switch did not have a positive result. As a consequence also verifying that the switch is enabled fails. This result is analyzed, step 703. The results and the analysis are then used in determining new instructions, step 704. The process is similar to the earlier one, however, this time the device learning service already knows that the earlier instructions failed and the new instructions are based on the feedback and the earlier accumulated data.

The new instructions are then sent to the tested device, step 706. In the example of FIG. 7 the simulated touch is configured to cause a swipe on the switch instead of a simple click. The execution process can be the same as in the earlier trial, however, as it is already known that the switch is not enabled there is no need to check it again. Thus, the feedback also comprises an indication that swipe was successful, the switch is enabled, the screenshot and the screen source, step 706. The feedback is again analyzed and stored, step 707. The results comprise information how to verify the switch status and how to enable it. Furthermore the screenshot and screen source code are used as a teaching material. The device learning service works in a manner that it is also capable of using the successful attempts as a basis for the next generation of the instructions. For example, if the device learning service is provided with a number of devices wherein a swipe is used instead of a click, then eventually the instruction generation starts to produce instructions involving swipe in the first set of instructions. It does not necessarily happen when testing the next similar device because it the use of swipe in the device may be exception, either intentional or unintentional.

In the description above examples are provided for better understanding of the current device testing arrangement. The examples are not intended to be an exhaustive list but merely facilitating the implementation. For example, the use cases or instruction sequences comprising tasks are not limited to enabling mobile data connection. Other examples include enable/disable airplane mode, select preferred network mode, make a call, answer a call and similar. In principle, a use case can be defined for every single feature of the mobile device. The device learning use cases can be organized into higher level groups. For example: "basic call management" group contains all use cases that are needed for making, answering and rejecting calls, the "advanced call management" groups contains all use cases that are needed for holding, unholding and merging calls.

The list of available use cases can be requested from the device learning service after the device identification has been performed. The list is formulated from all available use cases based on the connected device. The applicable use cases are presented to the engineer operating the device learning host who has the possibility to add or remove use cases before starting the automated device learning process. After the target use cases are selected the device learning host triggers the device learning that will automate all selected use cases on the new target device.

For the sake of clarity in above examples instructions are sent one by one, however, in real life applications the instructions may be sent as bundles. The bundled instructions may also be executed as a bundle provided that they do not require feedback or further instructions that prevent the execution as a bundle.

In the above examples for testing mobile devices have been discussed. Similar principles may be used in testing networks using the particular devices. Testing of the network may require that the mobile device uses network in a manner that it normally would not use. Thus, when testing network functionality the use cases may be different to ones wherein the similar functionality, for example placing calls, is tested in a device testing. The device testing host, however, uses learned device instructions to command a selected device to perform all actions required for testing the network. In a network testing arrangement the used device has typically been completely learned, however, it is possible that a software update, bug or other reason prevents using the device according to the earlier instructions. In such case, it is possible, that the device testing host communicates with the device learning cloud and performs similar actions with the device learning host. For example, in case of unexpected error, it is possible to use device learning service to determine if the error is because of a malfunctioning device or network, or if the device has been changed. An example of such detectable change is that according to the instructions a check box needs to be checked but in the indicated location is a slide.

The above mentioned method may be implemented as computer software which is executed in a computing device able to communicate with a mobile device. When the software is executed in a computing device it is configured to perform the above described inventive method. The software is embodied on a computer readable medium so that it can be provided to the computing device, such as the device learning service 100 of FIG. 1.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the device testing arrangement may be implemented in various ways. The device testing arrangement and its embodiments are thus not limited to the examples described above; instead they may vary within the scope of the claims.

The invention claimed is:

1. A method for generating a device test automation configuration for testing network features of a mobile device comprising:

receiving a request to generate a new device test automation configuration for a mobile device from a client host to which the mobile device is connected, wherein the requested device test automation configuration is for testing network features of the mobile device;

receiving at least one use case comprising a set of steps to be performed in a functionality test of network features of the mobile device, wherein each of the steps comprises a set of tasks for performing the respective step;

generating instructions for performing the steps of the received at least one use case, wherein said generating further comprises performing the following steps at least once:

generating an initial set of instructions for a use case of the received at least one use case;

adapting the set of instructions based on the information generated earlier for similar mobile devices;

instructing the mobile device to perform the steps according to the use case;

receiving feedback from the mobile device, wherein the feedback is used in adapting the instructions; and using the received feedback and the information generated earlier as an input in an algorithm capable of adjusting instructions as a response to feedback for generating instructions for the mobile device; and storing the device test automation configuration comprising the use cases based on the generated instructions for the mobile device to a database for further use for testing network functionality of another mobile device.

2. A method according to claim 1, wherein the method further comprises transmitting the generated device test automation configuration to a device testing host for testing a plurality of mobile devices in accordance with the generated device test automation configuration.

3. A method according to claim 1, wherein the algorithm capable of adjusting instructions as a response to feedback is a machine learning algorithm for generating instructions for the mobile device.

4. A method according to claim 1, wherein generating instructions for performing the steps of the received at least one use case comprises providing a plurality of instructions in one instruction set.

5. A method according to claim 4, wherein receiving feedback from the mobile device comprises receiving feedback as a response to one or more instruction set.

6. A method according to claim 1, wherein the method further comprises analyzing feedback.

7. A method according to claim 1, wherein the feedback comprises a screenshot of the tested device.

8. A method according to claim 1, wherein the feedback comprises a source code of a screen of the tested device.

9. A method according to claim 1, wherein the feedback comprises outputs of the instructions executed.

10. A method according to claim 1, wherein the feedback comprises a device log.

11. A non-transitory computer-readable mediumcomputer program comprising computer program code, which is configured to cause performing a method according to claim 1, when the computer program is executed in a computing device.

12. An apparatus for generating a device test automation configuration for testing network features of a mobile device comprising, which apparatus further comprises:

at least one processor configured to execute computer programs;

at least one memory configured to store computer programs and related data;

at least one network connection for receiving and transmitting instructions to external devices;

wherein the apparatus is configured to perform a method according to claim 1.

13. A computer-implemented method using a computer program configured to cause performing a method according to claim 1 when the computer program is executed from a non-transitory computer-readable medium of a computing device.

14. A method according to claim 1, further comprising retrieving the stored device test automation configuration for testing network functionality of another mobile device.

15. A method according to claim 14, further comprising using the retrieved device test automation configuration for testing network functionality of the another mobile device.

16. A method according to claim 1, further comprising using the stored device test automation configuration for testing network functionality of another mobile device.

\* \* \* \* \*